US012650759B2

(12) United States Patent
Vu et al.

(10) Patent No.: US 12,650,759 B2
(45) Date of Patent: Jun. 9, 2026

(54) INFORMATION PROCESSING APPARATUS AND CONTROL METHOD

(71) Applicant: Lenovo (Singapore) Pte. Ltd., Singapore (SG)

(72) Inventors: Tran Minh Khuong Vu, Kanagawa (JP); Qiang Yao, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 19/064,932

(22) Filed: Feb. 27, 2025

(65) Prior Publication Data

US 2025/0306733 A1 Oct. 2, 2025

(30) Foreign Application Priority Data

Mar. 27, 2024 (JP) ................................. 2024-051190

(51) Int. Cl.
*G06F 3/0482* (2013.01)
*G06F 3/04883* (2022.01)
(Continued)

(52) U.S. Cl.
CPC ........ *G06F 3/0482* (2013.01); *G06F 3/04883* (2013.01); *G06F 40/284* (2020.01); *G06T 11/23* (2026.01)

(58) Field of Classification Search
CPC .... G06F 3/0237; G06F 3/0482; G06F 3/0488; G06F 3/04883; G06F 40/284; G06T 11/203; G06V 30/268; G06V 30/387
See application file for complete search history.

(56) References Cited

U.S. PATENT DOCUMENTS

2015/0135065 A1 5/2015 Hirabayashi et al.
2017/0270357 A1* 9/2017 Winebrand .......... G06V 30/347
(Continued)

FOREIGN PATENT DOCUMENTS

CN 111242840 A 6/2020
JP H08212288 A 8/1996
(Continued)

OTHER PUBLICATIONS

Extended European Search Report issued in corresponding European Patent Application No. 25156228.6, dated Mar. 13, 2025 (11 pages).

*Primary Examiner* — Nitin Patel
*Assistant Examiner* — Amen W Bogale
(74) *Attorney, Agent, or Firm* — Osha Bergman Watanabe & Burton LLP

(57) ABSTRACT

An information processing apparatus includes: an input unit capable of detecting handwritten input; a display unit capable of displaying a trajectory of the handwritten input; a text recognition unit which recognizes text based on the handwritten input detected by the input unit; a prediction processing unit which predicts text candidates following the text based on the text recognized by the text recognition unit; a handwriting synthesis unit which synthesizes the text candidates predicted by the prediction processing unit into handwritten characters by combining first generation processing to generate handwritten characters based on tokens, each of which is a set of one or more handwriting strokes, collected from the handwritten input by a user, and second generation processing to generate handwritten characters based on a conversion model prepared in advance for converting text characters to handwritten characters; and a display processing unit which displays, on the display unit, the handwritten characters.

6 Claims, 13 Drawing Sheets

(51) Int. Cl.
    *G06F 40/284*         (2020.01)
    *G06T 11/23*          (2026.01)

(56)             References Cited

U.S. PATENT DOCUMENTS

| 2021/0166013 | A1 | 6/2021 | Tensmeyer et al. |
| 2021/0279457 | A1 | 9/2021 | Suyash |
| 2023/0419033 | A1 | 12/2023 | Bathiche et al. |
| 2023/0419703 | A1* | 12/2023 | Bathiche .............. G06V 30/347 |

FOREIGN PATENT DOCUMENTS

| JP | 2014067147 A | 4/2014 |
| JP | 2015114976 A | 6/2015 |
| JP | 2019507915 A | 3/2019 |

* cited by examiner

| TEXT CHARACTER STRING | TOKEN INFORMATION | | . . . |
|---|---|---|---|
| to be or | to be or | ▨▨▨▨ ⋯ | . . . |
| to | to | ▨▨▨▨ ⋯ | . . . |
| that | that | ▨▨▨▨ ⋯ | . . . |
| the | the | ▨▨▨▨ ⋯ | . . . |
| . . . | . . . | . . . | . . . |

FIG. 4

INFORMATION PROCESSING APPARATUS AND CONTROL METHOD

BACKGROUND OF THE INVENTION

Cross-Reference to Related Applications

This application claims priority to Japanese Patent Application No. 2024-051190 filed on Mar. 27, 2024, the contents of which are hereby incorporated herein by reference in their entirety.

Field of the Invention

Embodiments of the present invention relate to an information processing apparatus and a control method.

Description of the Related Art

In recent years, there is known an information processing apparatus, such as a laptop personal computer (hereinafter called a laptop PC) or a tablet terminal, that enables handwritten input with a pen or a finger (for example, see Japanese Unexamined Patent Application Publication (Translation of PCT Application) No. 2019-507915). In this kind of information processing apparatus, an easy-to-use user interface can be realized such as to deepen the understanding of a document with a handwritten note added thereto.

SUMMARY OF THE INVENTION

However, in a conventional information processing apparatus, when outputting handwritten characters by making input predictions to improve the productivity of character input, processing takes time and hence there is a delay before providing a display because handwritten characters are generated character by character.

One or more embodiments of the present invention provide an information processing apparatus and a control method capable of reducing a delay in displaying handwritten characters.

In accordance with one or more embodiments of the present invention, an information processing apparatus according to one aspect of the present invention includes: an input unit capable of detecting handwritten input; a display unit capable of displaying a trajectory of the handwritten input; a text recognition unit which recognizes text based on the handwritten input detected by the input unit; a prediction processing unit which predicts text candidates following the text based on the text recognized by the text recognition unit; a handwriting synthesis unit which synthesizes the text candidates predicted by the prediction processing unit into handwritten characters by combining first generation processing to generate handwritten characters based on tokens, each of which is a set of one or more handwriting strokes, collected from the handwritten input by a user, and second generation processing to generate handwritten characters based on a conversion model prepared in advance for converting text characters to handwritten characters; and a display processing unit which displays, on the display unit, the handwritten characters corresponding to the text candidates and synthesized by the handwriting synthesis unit.

The above information processing apparatus according to the one aspect of the present invention may further include a lookup table storage unit which stores a lookup table in which token information indicative of each of the tokens is associated with each text string, wherein the handwriting synthesis unit generates, by the first generation processing, handwritten characters corresponding to a character string that matches the text string stored in the lookup table storage unit among the text candidates, and the handwriting synthesis unit generates, by the second generation processing, handwritten characters corresponding to characters that do not match the text string stored in the lookup table storage unit among the text candidates.

The above information processing apparatus according to the one aspect of the present invention may also be such that the handwriting synthesis unit synthesizes the text candidates into handwritten characters by executing first processing to extract a character string of an N character count from the text candidates in the first generation processing, and when the extracted character string matches the text string stored in the lookup table storage unit, the handwriting synthesis unit converts the text string to the handwritten characters based on the token information corresponding to the matched text string (note that N is an integer equal to or more than 1), second processing to subtract 1 from N after the first processing so as to repeat the first processing until the N character count becomes one character count, and third processing to generate, by the second generation processing, a handwritten character for a character that does not match after the second processing.

Further, the above information processing apparatus according to the one aspect of the present invention may further include a token generation unit which collects the tokens based on the trajectory of the handwritten input, and stores, in the lookup table storage unit, the collected tokens in association between each piece of the token information and each of the text strings for each of the tokens.

Further, the above information processing apparatus according to the one aspect of the present invention may be such that the display processing unit displays, on the display unit, display information indicative of the text candidates predicted by the prediction processing unit, and when the input unit accepts a consent operation to consent to the text candidates, the display processing unit displays, on the display unit, the handwritten characters corresponding to the text candidates and synthesized by the handwriting synthesis unit.

Further, the above information processing apparatus according to the one aspect of the present invention may be such that the display processing unit displays, on the display unit, the text candidates in a specific font as display information indicative of the text candidates, and when the input unit accepts the consent operation, the display processing unit changes the text candidates being displayed in the specific font to the handwritten characters synthesized by the handwriting synthesis unit.

Further, a control method according to another aspect of the present invention is a control method for an information processing apparatus including an input unit capable of detecting handwritten input and a display unit capable of displaying a trajectory of the handwritten input, the control method including: a step of causing a text recognition unit to recognize text based on the handwritten input detected by the input unit; a step of causing a prediction processing unit to predict text candidates following the text based on the text recognized by the text recognition unit; a step of causing a handwriting synthesis unit to synthesize the text candidates predicted by the prediction processing unit into handwritten characters by combining first generation processing to generate handwritten characters based on tokens, each of which is a set of one or more handwriting strokes, collected from the handwritten input by a user, and second generation processing to generate handwritten characters based on a conversion model prepared in advance for converting text characters to handwritten characters; and a step of causing a display processing unit to display, on the display unit, the handwritten characters corresponding to the text candidates and synthesized by the handwriting synthesis unit.

The above-aspects of the present invention can reduce a delay in displaying handwritten characters.

BRIEF DESCRIPTION OF THE DRAWINGS

FIG. 4 is a table illustrating data examples of a lookup table storage unit according to one or more embodiments.

DETAILED DESCRIPTION OF THE INVENTION

An information processing apparatus and a control method according to one or more embodiments of the present invention will be described below with reference to the accompanying drawings.

Figure 1:
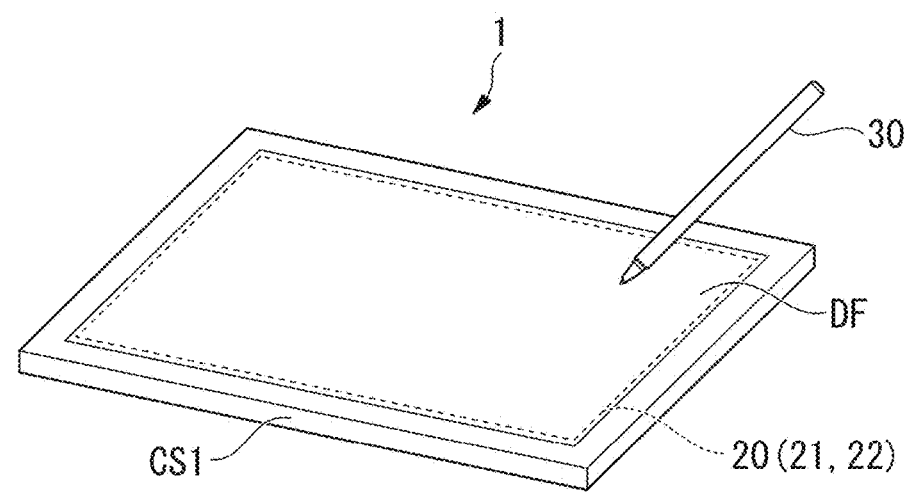
FIG. 1 is an external view illustrating an example of a tablet terminal according to one or more embodiments.

FIG. 1 is an external view illustrating an example of a tablet terminal 1 according to one or more embodiments. Note that the tablet terminal 1 will be described as an example of an information processing apparatus.

As illustrated in FIG. 1, a touch screen 20 is placed on one main surface of a chassis CS1, and the tablet terminal 1 executes various processing, for example, by an application program or the like that enables handwritten input using a pen 30.

The touch screen 20 includes a display unit 21 and a touch sensor unit 22. The display unit 21 displays various information on a display screen DF.

The touch sensor unit 22 is placed over the display unit 21 to detect that the pen 30 (an example of an operating medium) touches the display screen DF of the display unit 21, and detect the touch position of the pen 30.

Note that the details of the touch screen 20, the display unit 21, and the touch sensor unit 22 will be described later.

Figure 2:
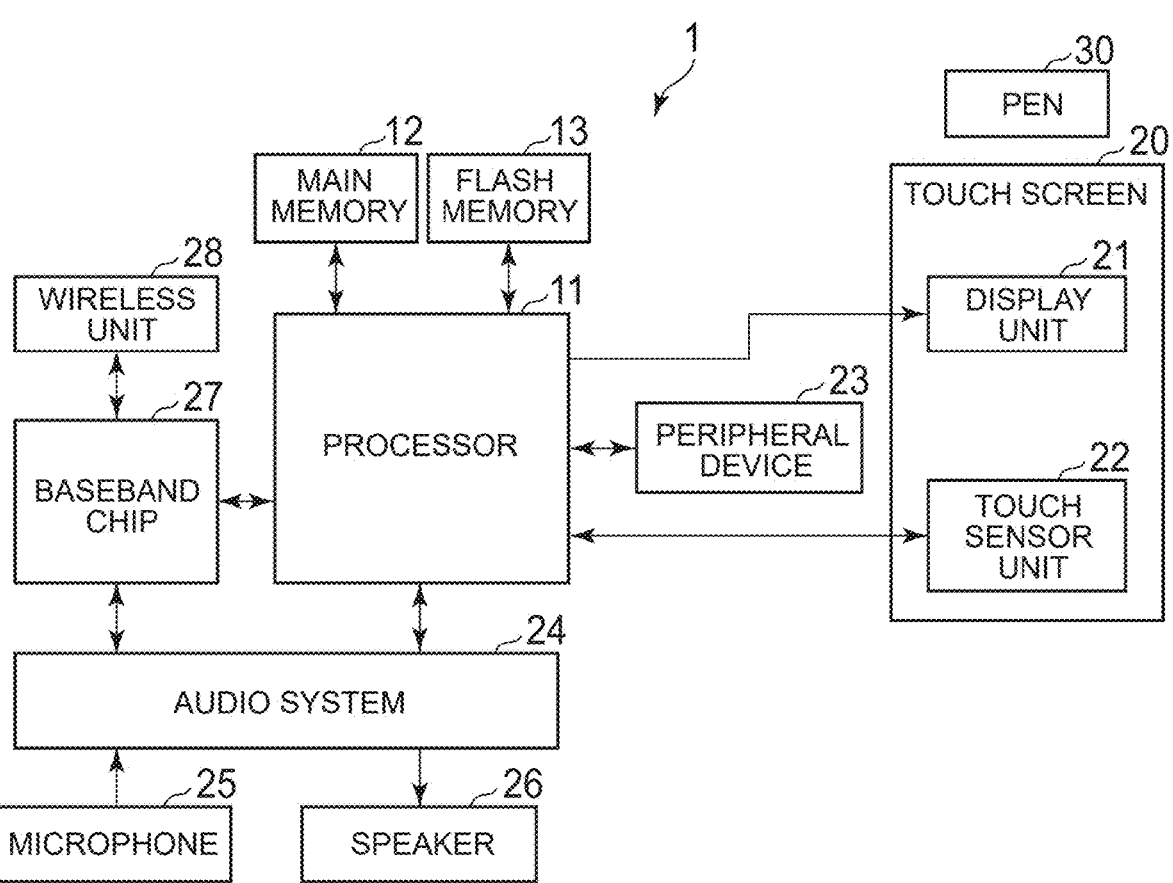
FIG. 2 is a diagram illustrating an example of a main hardware configuration of the tablet terminal according to one or more embodiments.

Referring next to FIG. 2, a main hardware configuration of the tablet terminal 1 will be described.

FIG. 2 is a diagram illustrating an example of the main hardware configuration of the tablet terminal 1 according to one or more embodiments.

As illustrated in FIG. 2, the tablet terminal 1 includes a processor 11, a main memory 12, a flash memory 13, the touch screen 20, a peripheral device 23, an audio system 24, a microphone 25, a speaker 26, a baseband chip 27, and a wireless unit 28.

The processor 11 is an application processor including, for example, a CPU (Central Processing Unit). The processor 11 controls the entire tablet terminal 1.

The main memory 12 is a writable memory used as reading areas of execution programs of the processor 11 or working areas to which processed data of the execution programs are written. The main memory 12 is composed, for example, of plural DRAM (Dynamic Random Access Memory) chips. The execution programs include an OS (Operating System), various device drivers for hardware-operating peripheral devices, various services/utilities, application programs (application software), and the like.

The flash memory 13 is, for example, a flash EEPROM (Electrically Erasable Programmable Read Only Memory) that stores the OS, various drivers, various services/utilities, application programs (hereinafter, which may also be called "applications"), and various data.

The display unit 21 is, for example, a liquid crystal display or an organic EL (Electro-Luminescence) display to provide a display based on drawing data (display data) output form the processor 11.

The touch sensor unit 22 detects a touch of the pen 30 (operating medium) and the touch position on the screen of the display unit 21 (on the display screen DF). The touch sensor unit 22 can detect the position of the pen 30 on the screen, for example, by a capacitive method, an electromagnetic induction method, or the like. The touch sensor unit 22 detects detection position data (raw data) of the pen 30 at a given detection interval (sampling cycle). The touch sensor unit 22 is an example of an input unit capable of detecting handwritten input with the pen 30.

Further, the touch sensor unit 22 is internally equipped with a CPU and a storage unit such as a RAM and a ROM, which are not illustrated, and can execute various processing such as to remove noise from detection position data of the pen 30 by the CPU executing firmware stored in the storage unit.

The audio system 24 is, for example, an audio IC (Integrated Circuit), which inputs, records, plays back, and outputs sound data. For example, the microphone 25 and the speaker 26 are connected to the audio system 24. For example, the audio system 24 outputs sound data collected by the microphone 25 to the processor 11 or the baseband chip 27. Further, for example, the audio system 24 converts sound data acquired from the processor 11 or the baseband chip 27 into a sound signal, and outputs the sound signal to the speaker 26.

The microphone 25 collects sounds around the tablet terminal 1. For example, when reconciling sounds with another terminal, the microphone 25 collects sounds such as user's voice.

The speaker 26 outputs various sounds to the outside of the tablet terminal 1. For example, when reconciling sounds with the other terminal, the speaker 26 outputs sounds (emits sounds) received from the other terminal.

The baseband chip 27 is, for example, a dedicated IC to control wireless communication such as 4G (the 4th generation mobile communication system) or 5G (the 5th generation mobile communication system). The baseband chip 27 outputs voice data received, for example, by using the wireless unit 28 to the speaker 26 through the audio system 24. Further, for example, the baseband chip 27 acquires sound data collected from the microphone 25 through the audio system 24, and outputs the sound data using the wireless unit 28 through the mobile communication system. Further, the baseband chip 27 performs data communication with the processor 11 on input/output data of data communication through the mobile communication system.

The wireless unit 28 is a wireless communication device including an antenna for performing wireless communication through the mobile communication system.

The pen 30 is a pen-like operating medium such as a touch pen or a stylus pen. Note that the pen 30 may be configured to include, for example, a resonant circuit so that power is supplied by electromagnetic induction to a coil in the resonant circuit to be able to detect the position and angle of the pen 30 on the screen of the display unit 21 using the resonant circuit.

Figure 3:
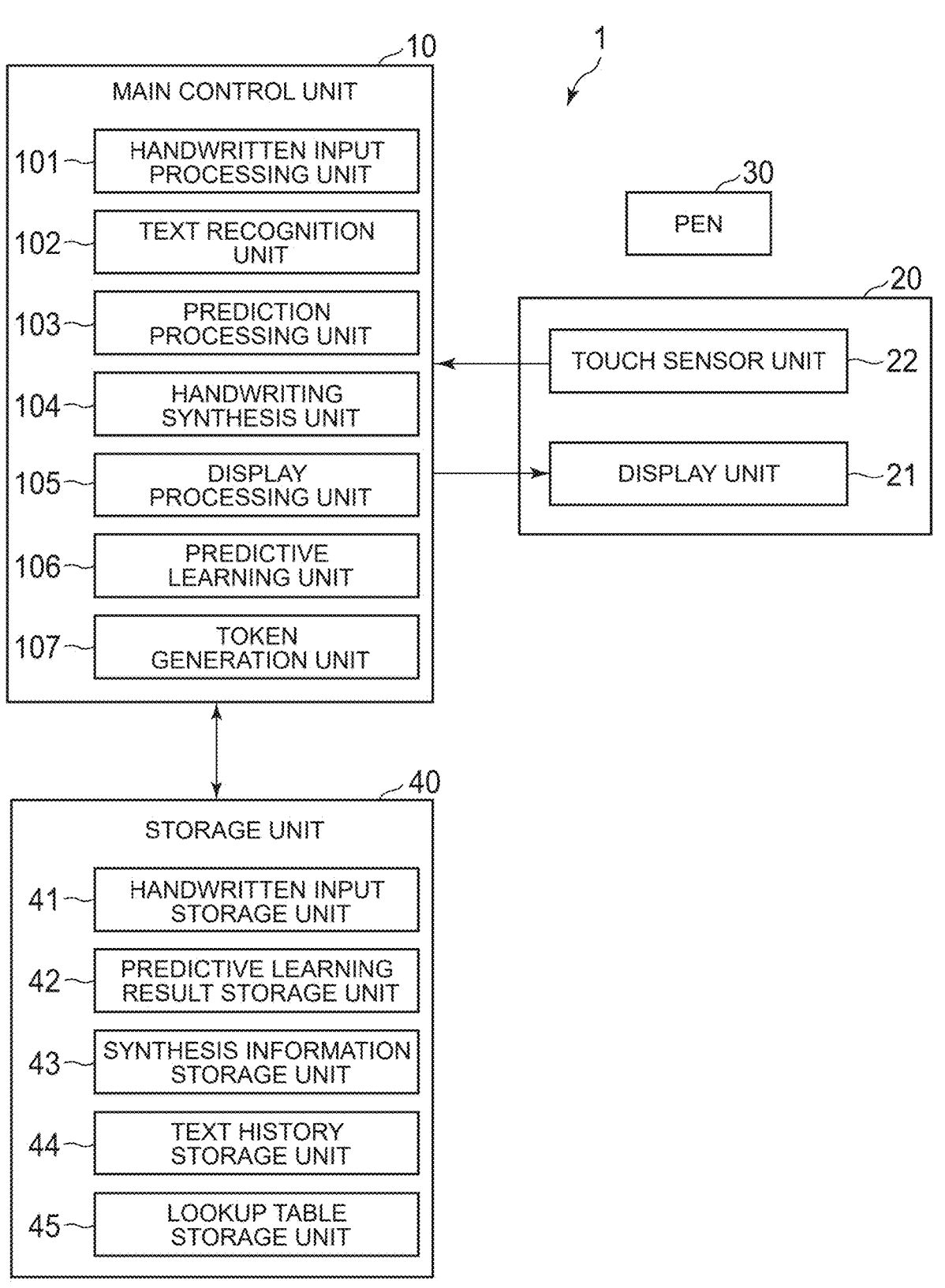
FIG. 3 is a block diagram illustrating an example of the functional configuration of the tablet terminal according to one or more embodiments.

Referring next to FIG. 3, the functional configuration of the tablet terminal 1 according to one or more embodiments will be described.

FIG. 3 is a block diagram illustrating an example of the functional configuration of the tablet terminal 1 according to one or more embodiments.

As illustrated in FIG. 3, the tablet terminal 1 includes a main control unit 10, the touch screen 20, the pen 30, and a storage unit 40.

The touch screen 20 includes the display unit 21 and the touch sensor unit 22.

The storage unit 40 is, for example, a storage unit realized by the main memory 12 or the flash memory 13. The storage unit 40 includes a handwritten input storage unit 41, a predictive learning result storage unit 42, a synthesis information storage unit 43, a text history storage unit 44, and a lookup table storage unit 45.

The handwritten input storage unit 41 is, for example, a storage unit realized by the main memory 12 to store handwritten input data. The handwritten input data is, for example, pen input data indicative of a movement trajectory of the pen 30 based on the detection position data of the pen 30 detected by the touch sensor unit 22.

The predictive learning result storage unit 42 is, for example, a storage unit realized by the flash memory 13 to store the predictive learning result (next-text predictive model). Note that the predictive learning result is a predictive model for predicting text candidates following input text from the input text (for example, a word, part of a sentence, or the like), which is the result of being trained by machine learning based, for example, on user's past handwritten input or text input, a fixed text template, and the like.

The synthesis information storage unit 43 is, for example, a storage unit realized by the flash memory 13 to store a conversion model (handwriting synthesis model) to convert text characters to handwritten characters. The conversion model is a synthesis model for synthesizing the input text characters into user's handwritten characters, which is a result of machine learning based, for example, on user's past handwritten inputs.

The text history storage unit 44 is, for example, a storage unit realized by the flash memory 13 to store text input history information in the past. The text input history information stored in the text history storage unit 44 is used for training of the predictive learning result (next-text predictive model) described above.

The lookup table storage unit 45 is, for example, a storage unit realized by the flash memory 13 to store a lookup table used for handwritten character conversion using tokens. Here, the tokens are collected from user's handwritten input, each of which is a set of one or more handwriting strokes that represent a complete character string having one or more meanings. For example, as illustrated in FIG. 4, the lookup table storage unit 45 stores a lookup table in which each token text string and token information are associated with each other.

FIG. 4 is a table illustrating data examples of the lookup table storage unit 45 in one or more embodiments. As illustrated in FIG. 4, the lookup table storage unit 45 stores each token text string and token information in association with each other. Here, the token information is information indicative of token handwritten characters, obtained, for example, by encoding the token handwritten characters into data including encoded data convertible to the token handwritten characters by decoder processing to be described later. Further, raw image data of the token handwritten characters may be included in the token information.

For example, in the example illustrated in FIG. 4, the lookup table storage unit 45 stores "to be or" (text character string) as a token, and token information as an image of corresponding handwritten characters and encoded data in association with one another. Further, regarding "to," "that," and "the" as tokens, the lookup table storage unit 45 stores each text string and the token information in association with each other in the same way.

Returning to the description of FIG. 3, the main control unit 10 is a functional unit implemented, for example, by the processor 11 executing a program stored in the main memory 12 or the flash memory 13, which executes various processing based on the OS (for example, Android (registered trademark) or the like). The main control unit 10 includes a handwritten input processing unit 101, a text recognition unit 102, a prediction processing unit 103, a handwriting synthesis unit 104, a display processing unit 105, a predictive learning unit 106, and a token generation unit 107.

The handwritten input processing unit 101 is a functional unit implemented, for example, by the processor 11 executing a program stored in the main memory 12 or the flash memory 13 to execute handwritten input processing. The handwritten input processing unit 101 acquires, from the touch sensor unit 22 of the touch screen 20, detection position data of the operating medium such as the pen 30, and displays, on the display unit 21, a movement trajectory of the pen 30 (handwritten input) based on the acquired detection position data. The handwritten input processing unit 101 causes the display processing unit 105 to display the movement trajectory of the pen 30 (handwritten input) in a manner to be described later. Further, the handwritten input processing unit 101 stores handwritten input data in the handwritten input storage unit 41.

The text recognition unit 102 is a functional unit implemented, for example, by the processor 11 executing a program stored in the main memory 12 or the flash memory 13 to recognize text based on handwritten input detected by the touch sensor unit 22. For example, the text recognition unit 102 converts handwritten input data to text data using known handwriting recognition technology.

Further, the text recognition unit 102 stores the converted text data in the text history storage unit 44 as text input history information.

The prediction processing unit 103 is a functional unit implemented, for example, by the processor 11 executing a program stored in the main memory 12 or the flash memory 13 to predict, based on the text recognized by the text recognition unit 102, a text candidate following the text. The prediction processing unit 103 predicts the text candidate to be input next using, for example, the predictive learning result (next-text predictive model) of the text recognized by the text recognition unit 102 and stored in the predictive learning result storage unit 42.

In other words, the prediction processing unit 103 predicts the text candidate based on an input history of handwritten inputs by the user in the past.

Note that the prediction processing unit 103 may predict the text candidate word by word, or may predict the text candidate sentence by sentence. Further, the prediction processing unit 103 may predict the text candidate character by character, phrase by phrase, or numeric string by numeric string (for example, in the case of a telephone number), or the like. In other words, the text candidate may be any other content including numbers, symbols, characters, phrases, or sentences.

Further, for example, the prediction processing unit 103 may predict plural text candidates.

The handwriting synthesis unit 104 is a functional unit implemented, for example, by the processor 11 executing a program stored in the main memory 12 or the flash memory 13 to synthesize the text candidates (the content of the text candidates) predicted by the prediction processing unit 103 into handwritten characters. The handwriting synthesis unit 104 synthesizes the text candidates predicted by the prediction processing unit 103 into the handwritten characters by combining token-based processing (first generation processing) to generate handwritten characters based on a token, and model-based processing (second generation processing) to generate handwritten characters based on a conversion model prepared in advance for converting text characters to the handwritten characters.

Note that handwriting synthesis processing in combination of the token-based processing (first generation processing) and the model-based processing (second generation processing) is called hybrid processing. Further, the token is collected from user's handwritten input, which is a set of one or more handwriting strokes described above with reference to FIG. 4. Further, the model-based processing is handwriting conversion processing using an existing conversion model to perform the conversion to handwritten characters character by character.

The handwriting synthesis unit 104 generates handwritten characters by token-based processing from a character string that matches a text string among text candidates stored in the lookup table storage unit 45. Further, the handwriting synthesis unit 104 generates handwritten characters by model-based processing from a character string that does not match the text string among the text candidates stored in the lookup table storage unit 45. In the model-based processing, the handwriting synthesis unit 104 generates the handwritten characters character by character using the conversion model stored in the synthesis information storage unit 43.

Figure 5:
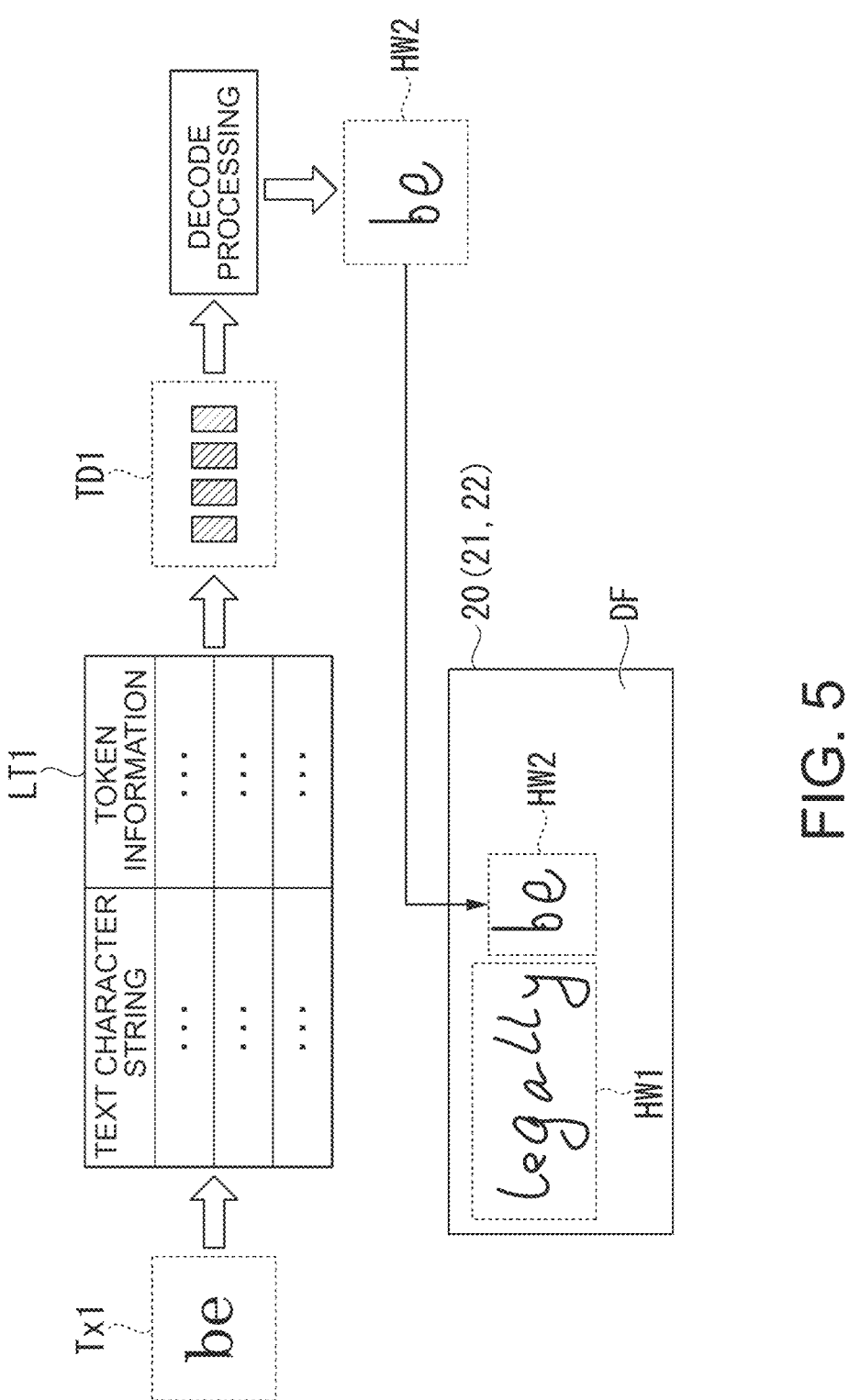
FIG. 5 is a diagram for describing an example of hand-writing conversion using a token in one or more embodiments.

Referring here to FIG. 5, handwriting conversion by the token-based processing of the handwriting synthesis unit 104 will be described.

FIG. 5 is a diagram for describing an example of handwriting conversion using a token in one or more embodiments.

The example in FIG. 5 illustrates processing in which the handwriting synthesis unit 104 converts a text string Tx1 ("be") as a text candidate to handwritten character string HW2 using the token, and puts the handwritten character string HW2 after an input handwritten character string HW1 ("Legally").

The handwriting synthesis unit 104 acquires token information TD1 (encoded data) corresponding to the text string Tx1 ("be") using a lookup table LT1 stored in the lookup table storage unit 45. The handwriting synthesis unit 104 performs decode processing to decode the token information TD1 (encoded data) and converts the decoded token information TD1 to the handwritten character string HW2 corresponding to "be." After displaying the handwritten character string HW1 ("Legally") on the display screen DF of the display unit 21, the display processing unit 105 to be described later displays the handwritten character string HW2 converted by the handwriting synthesis unit 104 in the token-based processing.

Figure 6:
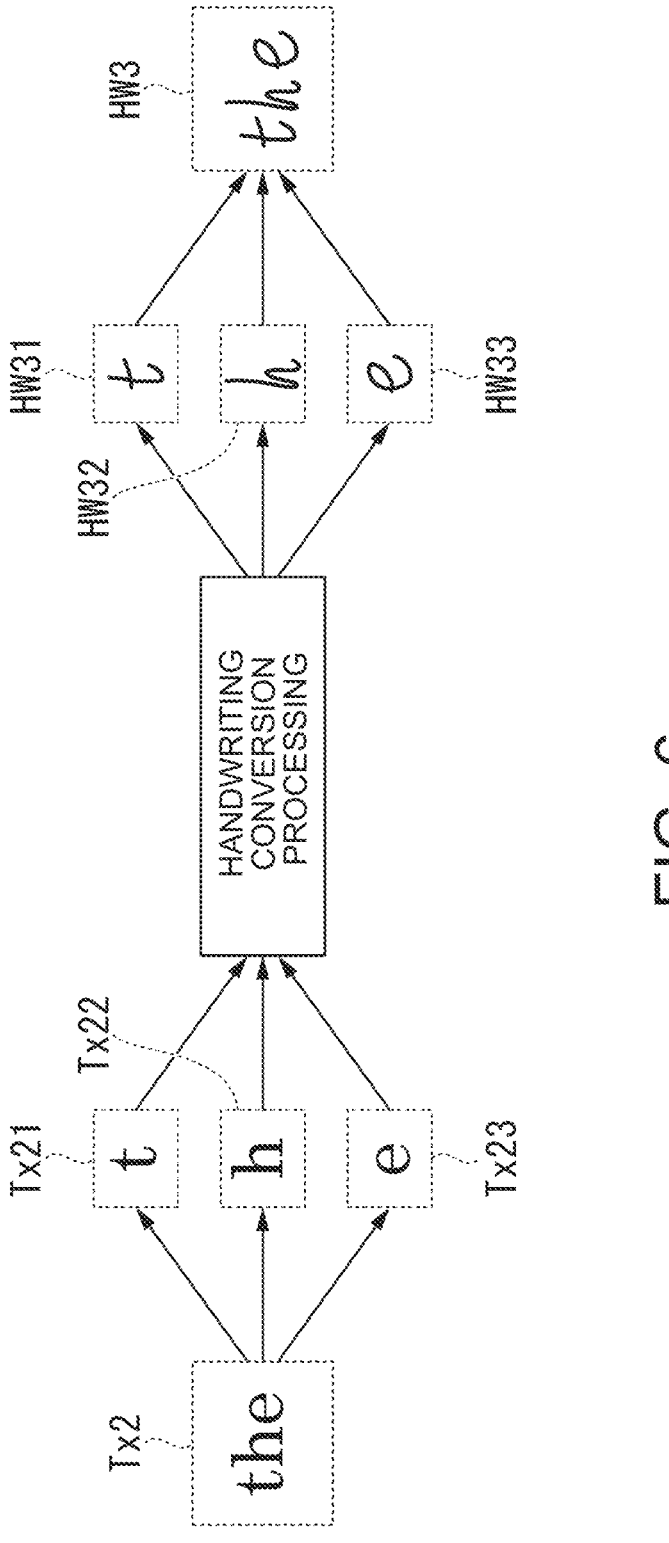
FIG. 6 is a diagram for describing an example of hand-writing conversion using a conversion model in one or more embodiments.

Referring next to FIG. 6, handwriting conversion by the model-based processing of the handwriting synthesis unit 104 will be described.

FIG. 6 is a diagram for describing an example of handwriting conversion using a conversion model in one or more embodiments.

The example in FIG. 6 illustrates processing (handwriting conversion processing) in which the handwriting synthesis unit 104 converts a text string Tx2 ("the") to a handwritten character string HW3 using the conversion model.

The handwriting synthesis unit 104 separates the text string Tx2 ("the") into a text character Tx21 ("t"), a text character Tx22 ("h"), and a text character Tx23 ("e"). The handwriting synthesis unit 104 uses the conversion model stored in the synthesis information storage unit 43 to convert the text character Tx21 ("t"), the text character Tx22 ("h"), and the text character Tx23 ("e") into a handwritten character HW31, a handwritten character HW32, and a handwritten character HW33 one by one, respectively. The handwriting synthesis unit 104 synthesizes the handwritten character HW31, the handwritten character HW32, and the handwritten character HW33 to generate the handwritten character string HW3.

Figure 7:
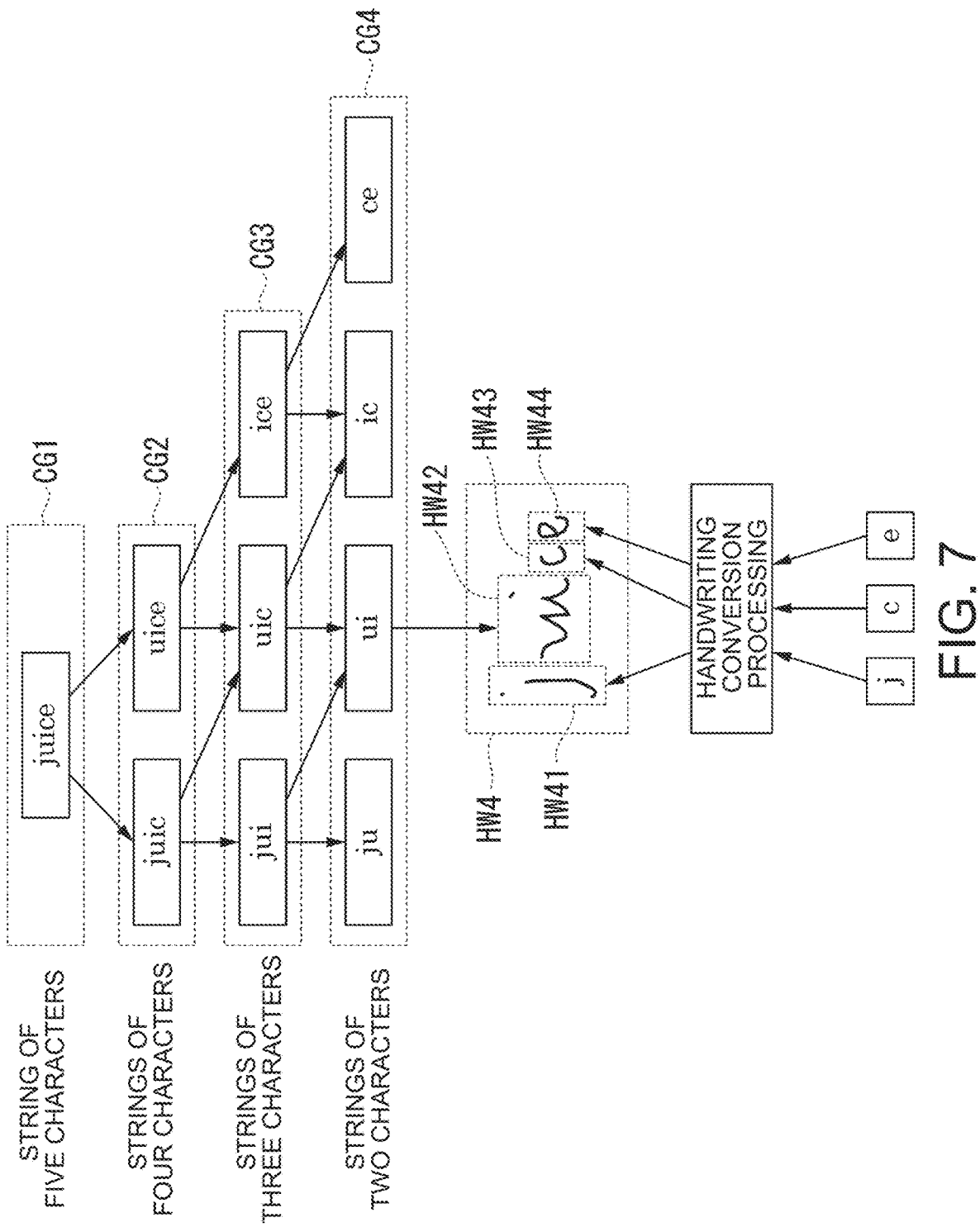
FIG. 7 is a diagram illustrating an example of handwriting synthesis processing of the tablet terminal according to one or more embodiments.

Referring next to FIG. 7, handwriting synthesis by the hybrid processing of the handwriting synthesis unit 104 will be described.

FIG. 7 is a diagram illustrating an example of handwriting synthesis processing of the tablet terminal 1 according to one or more embodiments.

The example in FIG. 7 illustrates an example in which the handwriting synthesis unit 104 converts a text character string "juice" to a handwritten character string HW4 by the hybrid processing.

As illustrated in FIG. 7, the handwriting synthesis unit 104 generates strings of four characters of "juic" and "uice" (strings of four characters CG2) from a text character string of "juice" as a string of five characters CG1, and determines which of the strings of four characters of "juic" and "uice"

exists in the lookup table stored in the lookup table storage unit 45. When either of the strings of four characters exists in the lookup table, the handwriting synthesis unit 104 performs the conversion to handwritten characters (four handwritten characters) using token information corresponding to the existing string of four characters.

Further, when there is no character string converted by the token-based processing described above, the handwriting synthesis unit 104 generates strings of three characters "jui," "uic," and "ice" (strings of three characters CG3) from the strings of four characters (the strings of four characters CG2) of "juic" and "uice." The handwriting synthesis unit 104 determines which one of the strings of three characters of "jui," "uic," and "ice" exists in the lookup table stored in the lookup table storage unit 45. When any one of the strings of three characters exists in the lookup table, the handwriting synthesis unit 104 performs the conversion to handwritten characters (three handwritten characters) using token information corresponding to the existing string of three characters.

Further, when there is a character string that is not converted by the token-based processing described above, the handwriting synthesis unit 104 generates strings of two characters of "ju," "ui," "ic," and "ce" (strings of two characters CG4) from the strings of three characters (the strings of three characters CG3) of "jui," "uic," and "ice." The handwriting synthesis unit 104 determines which one of the strings of two characters of "ju," "ui," "ic," and "ce" exists in the lookup table stored in the lookup table storage unit 45. When any one of the strings of two characters exists in the lookup table, the handwriting synthesis unit 104 performs the conversion to handwritten characters (two handwritten characters) using token information corresponding to the existing string of two characters.

In the example illustrated in FIG. 7, assuming that "ui" exists in the lookup table, decode processing is performed on token information corresponding to "ui" to generate handwritten characters HW42 corresponding to "ui."

Further, the handwriting synthesis unit 104 generates a handwritten character HW41, a handwritten character HW43, and a handwritten character HW44 respectively corresponding to the remaining text characters "j," "c," and "e" using the model-based processing (handwriting conversion processing) on the remaining characters "j," "c," and "e."

The handwriting synthesis unit 104 combines the generated handwritten character HW41, handwritten characters HW42, handwritten character HW43, and handwritten character HW44 to generate the handwritten character string HW4 corresponding to "juice."

Thus, in the token-based processing, the handwriting synthesis unit 104 extracts strings of an N character count from text candidates, and when an extracted character string matches a text string stored in the lookup table storage unit 45, the handwriting synthesis unit 104 executes first processing to convert the text character string to handwritten characters based on token information corresponding to the matched text character string (note that N is an integer equal to or more than 1). Then, after the first processing, the handwriting synthesis unit 104 subtracts 1 from N and executes second processing to repeat the first processing until the character count N becomes one character count.

Further, after the second processing, the handwriting synthesis unit 104 executes third processing on an unmatched character(s) to generate a handwritten character (s) by the model-based processing.

In other words, the handwriting synthesis unit 104 executes the first processing to the third processing described above to synthesize text candidates into handwritten characters by the hybrid processing in combination or the token-based processing and the model-based processing.

Returning to the description of FIG. 3 again, the display processing unit 105 is a functional unit implemented, for example, by the processor 11 executing a program stored in the main memory 12 or the flash memory 13 to execute processing to display, on the display unit 21, handwritten input and handwritten characters, obtained by converting text candidates, and the like.

For example, the display processing unit 105 displays, on the display unit 21, the handwritten input acquired by the handwritten input processing unit 101. Further, for example, the display processing unit 105 lists plural text candidates predicted by the prediction processing unit 103 together, and displays, on the display unit 21, the text candidates as display information indicative of the predicted text candidates. Further, the display processing unit 105 displays, on the display unit 21, handwritten characters synthesized by the handwriting synthesis unit 104, which correspond to a text candidate selected from among the plural text candidates.

Further, when displaying the handwritten characters corresponding to the text candidate, the display processing unit 105 checks the position and size of the handwritten characters to be displayed based on a bounding box of the handwritten input acquired by the handwritten input processing unit 101, and displays the handwritten characters in the right position and size. Here, the bounding box of the handwritten input is a box-shaped (rectangular) display area surrounding the handwritten input.

Note that the display processing unit 105 may display, on the display unit 21, display information indicative of the text candidate predicted by the prediction processing unit 103, and display, on the display unit 21, handwritten characters synthesized by the handwriting synthesis unit 104 as the display information indicative of the text candidate with a colored line different from the trajectory of the handwritten input. In this case, the display processing unit 105 displays, on the display unit 21, the handwritten characters of the text candidate, for example, with a gray line, and when accepting a consent operation to consent to the text candidate with an operation on the touch sensor unit 22, the display processing unit 105 displays the handwritten characters by changing the gray line of the handwritten input candidate to a black line.

Thus, the display processing unit 105 displays, on the display unit 21, the display information indicative of the text candidate predicted by the prediction processing unit 103, and when the consent operation to consent to the text candidate is accepted by the touch sensor unit 22, the display processing unit 105 displays, on the display unit 21, the handwritten characters synthetized by the handwriting synthesis unit 104 and corresponding to the text candidate.

Further, the display processing unit 105 may display, on the display unit 21, the text candidate in a specific font as the display information indicative of the text candidate, and when the consent operation is accepted by the touch sensor unit 22, the display processing unit 105 may change the text candidate displayed in the specific font to the handwritten characters synthesized by the handwriting synthesis unit 104.

The predictive learning unit 106 is a functional unit implemented, for example, by the processor 11 executing a program stored in the main memory 12 or the flash memory 13. The predictive learning unit 106 executes machine learning processing using, for example, the text history information stored in the text history storage unit 44 as training data, and stores the learning result (next-text predictive model) in the predictive learning result storage unit 42.

The token generation unit 107 is a functional unit implemented, for example, by the processor 11 executing a program stored in the main memory 12 or the flash memory 13 to collect tokens from user's handwritten input and store, in the lookup table storage unit 45, each of the collected token text strings and token information in association with each other as a lookup table.

Figure 8:
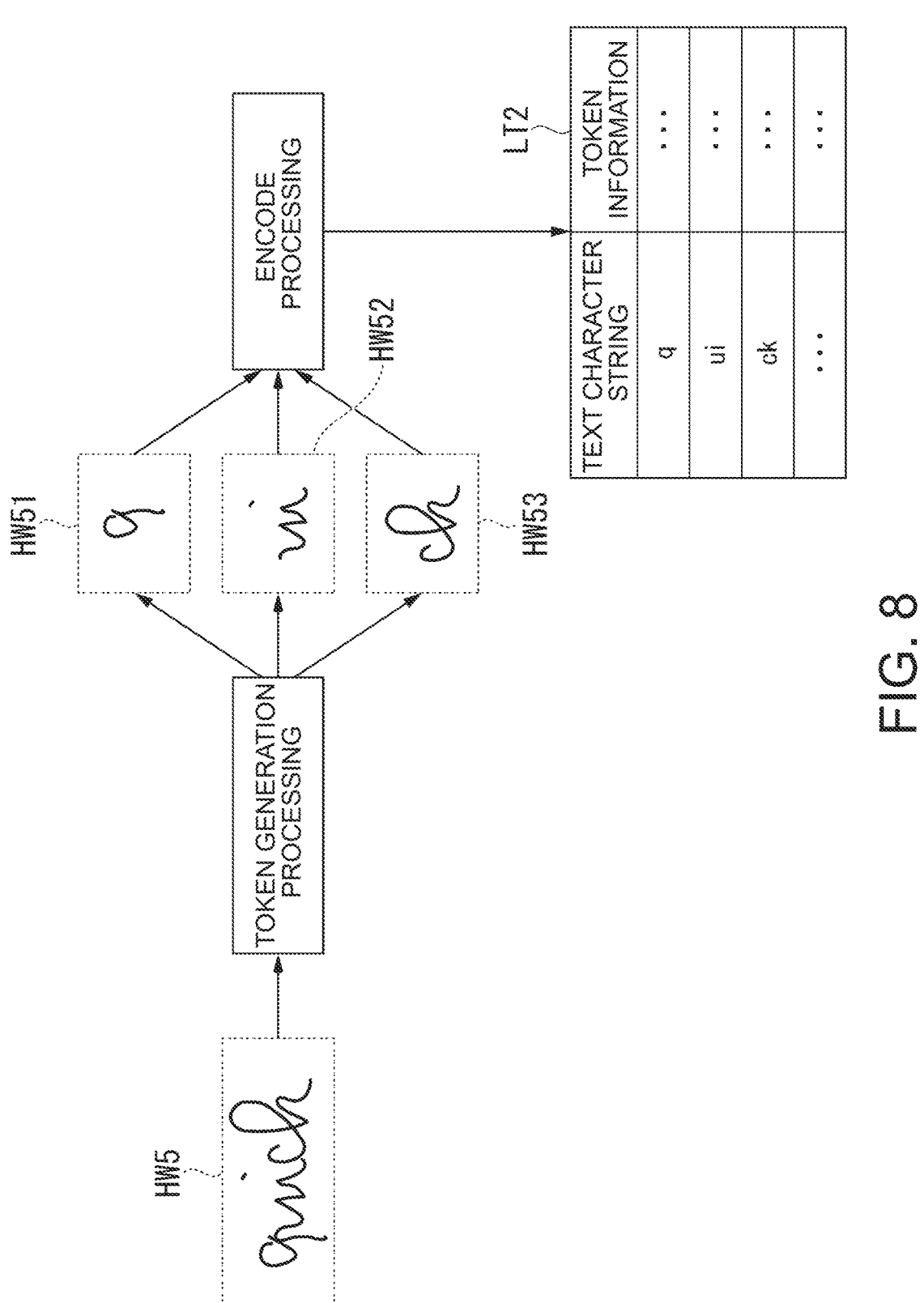
FIG. 8 is a diagram illustrating an example of generation processing to generate tokens and a lookup table in one or more embodiments.

Referring here to FIG. 8, generation processing to generate tokens and a lookup table by the token generation unit 107 will be described.

FIG. 8 is a diagram illustrating an example of generation processing to generate tokens and a lookup table in one or more embodiments.

In the example of FIG. 8, an example in which tokens are collected from handwritten character string HW5 ("quick") input by user's handwritten input to generate a lookup table will be described.

As illustrated in FIG. 8, the token generation unit 107 extracts, by token generation processing, tokens of a handwritten character HW51 ("q"), handwritten characters HW52 ("ui"), and handwritten characters HW53 ("ck") from the handwritten character string HW5 input by user's handwriting, and performs decode processing on the handwritten character HW51, the handwritten characters HW52, and the handwritten characters HW53, respectively, to generate token information (decoded data) corresponding to the respective handwritten characters.

Further, the token generation unit 107 generates a lookup table LT2 in which each of token text strings (a text character "q", text characters "ui", and text characters "ck") converted by the text recognition unit 102 and each piece of token information are associated with each other. The token generation unit 107 stores the generated lookup table LT2 in the lookup table storage unit 45.

Thus, the token generation unit 107 collects tokens based on a trajectory (ink strokes) of handwritten input, and stores, in the lookup table storage unit 45, each piece of token information and each text string for each token in association with each other.

Referring next to drawings, the operation of the tablet terminal 1 according to one or more embodiments will be described.

Figure 9:
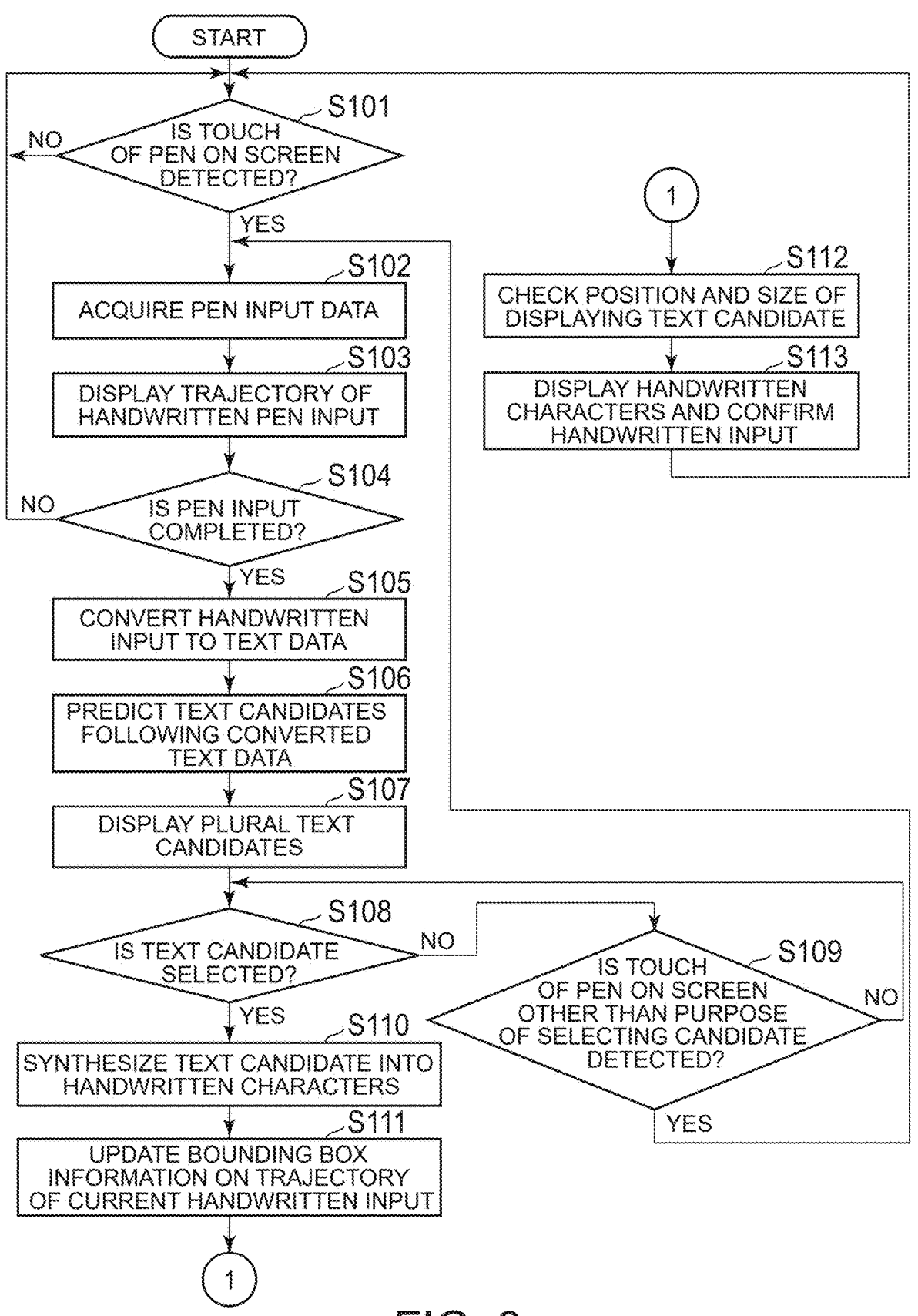
FIG. 9 is a flowchart illustrating an example of the operation of the tablet terminal according to one or more embodiments.

FIG. 9 is a flowchart illustrating an example of the operation of the tablet terminal 1 according to one or more embodiments.

As illustrated in FIG. 9, the tablet terminal 1 first determines whether or not a touch of the pen 30 on the screen (display screen DF) is detected (step S101). The handwritten input processing unit 101 of the tablet terminal 1 determines whether or not the touch sensor unit 22 detects a touch of the pen 30 on the display screen DF. When the touch sensor unit 22 detects the touch of the pen 30 (step S101: YES), the handwritten input processing unit 101 advances the processing to step S102. When the touch sensor unit 22 detects no touch of the pen 30 (step S101: NO), the handwritten input processing unit 101 returns the processing to step S101.

In step S102, the handwritten input processing unit 101 acquires pen input data. In other words, the handwritten input processing unit 101 acquires, as pen input data, position information of the pen 30 on the display screen DF detected by the touch sensor unit 22.

Next, the handwritten input processing unit 101 displays a trajectory of handwritten pen input (step S103). The handwritten input processing unit 101 stores, in the handwritten input storage unit 41, the acquired pen input data as handwritten pen input, and displays, on the display unit 21, the trajectory of the handwritten pen input using the display processing unit 105, for example, like handwritten input HW6 illustrated in FIG. 10 to be described later.

Next, the handwritten input processing unit 101 determines whether or not the pen input is completed (step S104). When the pen input is completed (step S104: YES), the handwritten input processing unit 101 advances the processing to step S105. When the pen input is not completed (step S104: NO), the handwritten input processing unit 101 returns the processing to step S101.

In step S105, the tablet terminal 1 converts the handwritten input to text data (text information). For example, the text recognition unit 102 of the tablet terminal 1 converts the handwritten input HW6 illustrated in FIG. 10 to text data as "how are." The text recognition unit 102 stores, in the text history storage unit 44, the converted text data as text input history information.

Next, the tablet terminal 1 predicts text candidates following the converted text data (step S106). The prediction processing unit 103 of the tablet terminal 1 predicts the text candidates following the text data converted by the text recognition unit 102 using, for example, the predictive learning result (next-text predictive model) stored in the predictive learning result storage unit 42. For example, the prediction processing unit 103 predicts plural text candidates.

Next, the tablet terminal 1 displays the plural text candidates on the display unit 21 (step S107). For example, as illustrated in display information (candidates CW1) of FIG. 10, the display processing unit 105 of the tablet terminal 1 lists the plural text candidates together and displays the text candidates on the display unit 21.

Figure 10:
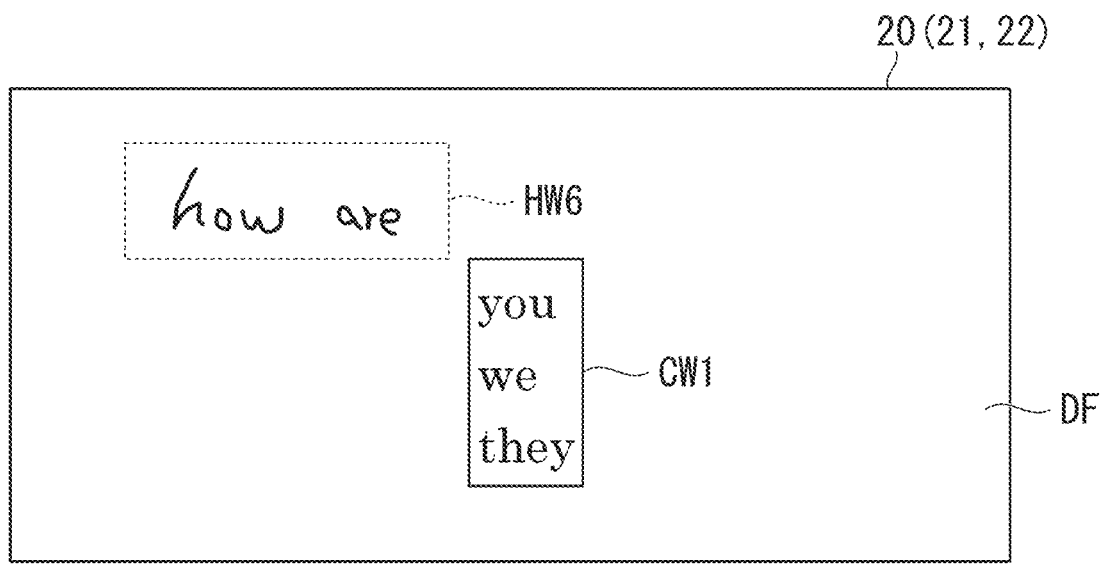
FIG. 10 is a first diagram illustrating an example of the operation of the tablet terminal according to one or more embodiments.

FIG. 10 is a first diagram illustrating an example of the operation of the tablet terminal 1 according to one or more embodiments.

The example in FIG. 10 illustrates a display example when the user makes the handwritten input HW6 using the touch sensor unit 22.

As illustrated in FIG. 10, the display processing unit 105 displays the user's handwritten input HW6 ("how are") on the display unit 21, and displays plural text candidates ("you," "we," and "they") in a manner to be vertically listed together as illustrated in the candidates CW1 (display information).

Note that the display processing unit 105 may also display, on the display unit 21, the plural text candidates CW1 in a manner to be sorted by the probability or any other factor, or may display the plural text candidate CW1 in order of likelihood to be selected.

Next, the tablet terminal 1 determines whether or not a text candidate is selected (step S108). The display processing unit 105 determines whether or not one of the plural text candidates (for example, "you," "we," "they" illustrated in FIG. 10) is selected with a user's operation on the touch sensor unit 22. When a text candidate is selected (step S108: YES), the display processing unit 105 advances the processing to step S110. When any text candidate is not selected (step S108: NO), the display processing unit 105 advances the processing to step S109. Note that the operation to select one of the plural text candidates with the user's operation on the touch sensor unit 22 is an example of the consent operation to consent to the text candidate.

In step S109, the tablet terminal 1 determines whether or not a touch of the pen 30 on the screen (display screen DF) other than the purpose of selecting a candidate is detected. When the touch sensor unit 22 detects the touch of the pen 30 other than the purpose of selecting a candidate (step S109: YES), the handwritten input processing unit 101 returns the processing to step S102. When the touch sensor unit 22 does not detect any touch of the pen 30 other than the purpose of selecting a candidate (step S109: NO), the handwritten input processing unit 101 returns the processing to step S108.

In step S110, the tablet terminal 1 synthesizes the text candidate into handwritten characters. The handwriting synthesis unit 104 of the tablet terminal 1 synthesizes the text candidate predicted by the prediction processing unit 103 into handwritten characters (for example, a handwritten character string HW7 illustrated in FIG. 11) by the hybrid processing in which the token-based processing and the model-based processing described above are combined.

Next, the tablet terminal 1 updates bounding box information on the trajectory of the current handwritten input (step S111). For example, the display processing unit 105 of the tablet terminal 1 updates the position and size of the bounding box of the handwritten input HW6 (the box-shaped (rectangular) display area surrounding the handwritten input HW6) illustrated in FIG. 10.

Next, the display processing unit 105 checks the position and size of displaying the text candidate (step S112). For example, the display processing unit 105 checks the position and size of the handwritten character string HW7 to be displayed based on the updated position and size of the bounding box of the handwritten input HW6.

Next, the display processing unit 105 displays the handwritten characters and confirms the handwritten input (step S113). For example, the display processing unit 105 displays the handwritten characters and confirms the handwritten input like the handwritten character string HW7 illustrated in FIG. 11.

Figure 11:
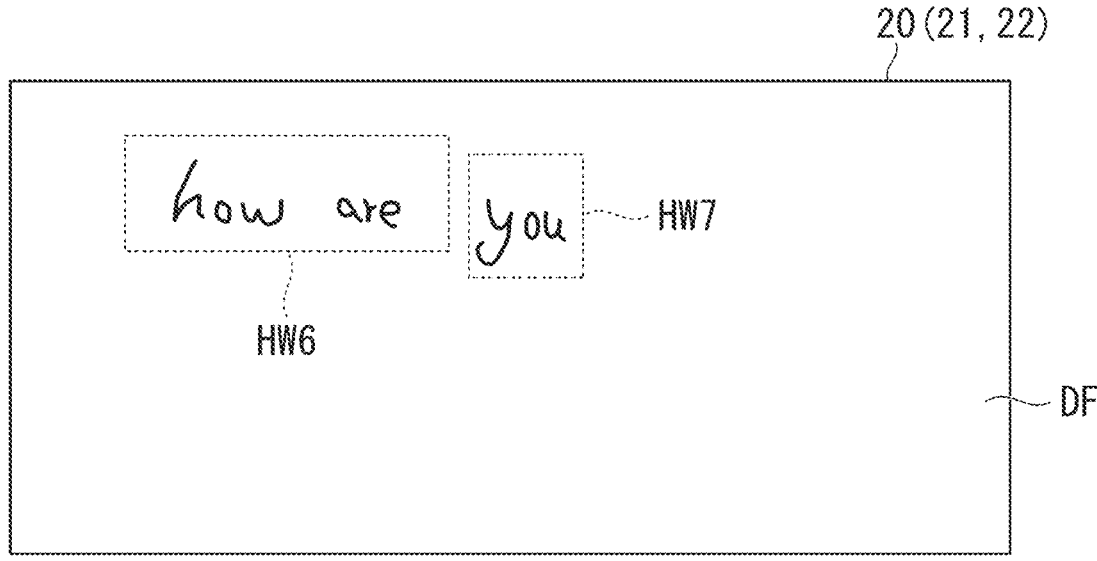
FIG. 11 is a second diagram illustrating the example of the operation of the tablet terminal according to one or more embodiments.

FIG. 11 is a second diagram illustrating the example of the operation of the tablet terminal 1 according to one or more embodiments.

The example in FIG. 11 illustrates a display example in which the text candidate "you" is selected from among the plural text candidates illustrated in FIG. 10, and the handwritten character string HW7 corresponding to the text candidate "you" is displayed.

As illustrated in FIG. 11, the display processing unit 105 displays, on the display unit 21, the handwritten character string HW7 converted by the handwriting synthesis unit 104 in the hybrid processing from the selected text candidate "you."

After the process in step S113, the display processing unit 105 returns the processing to step S101.

Figure 12:
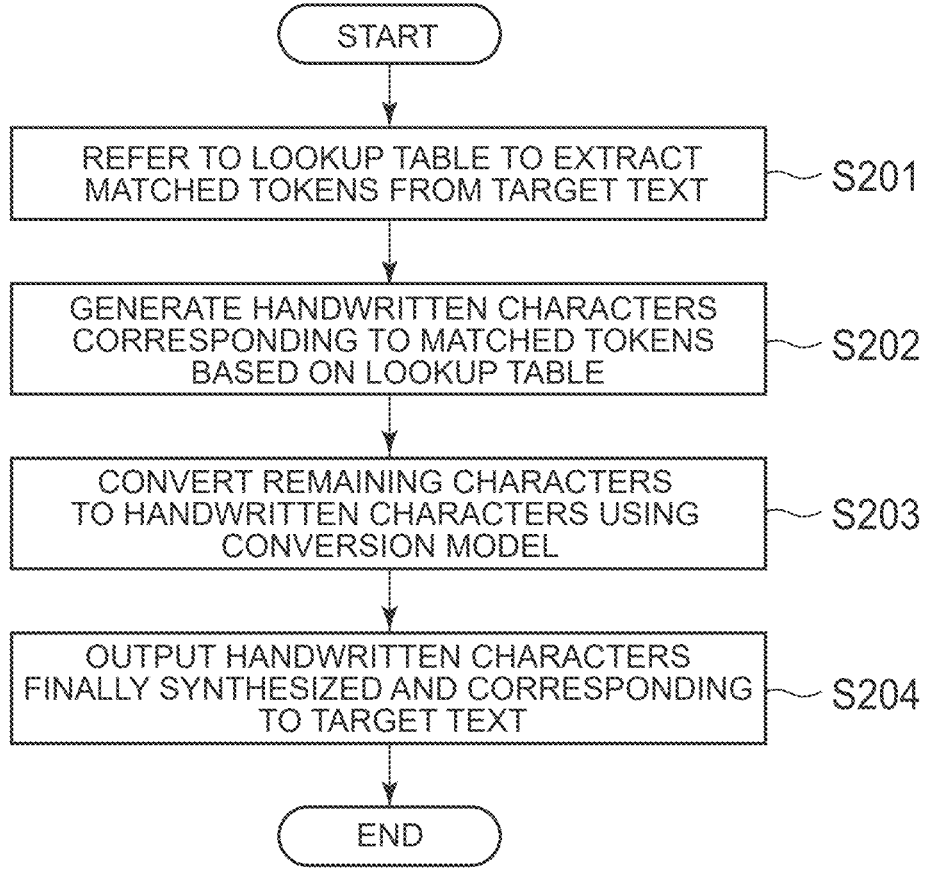
FIG. 12 is a flowchart illustrating an example of hand-writing synthesis processing of the tablet terminal according to one or more embodiments.
Figure 13:
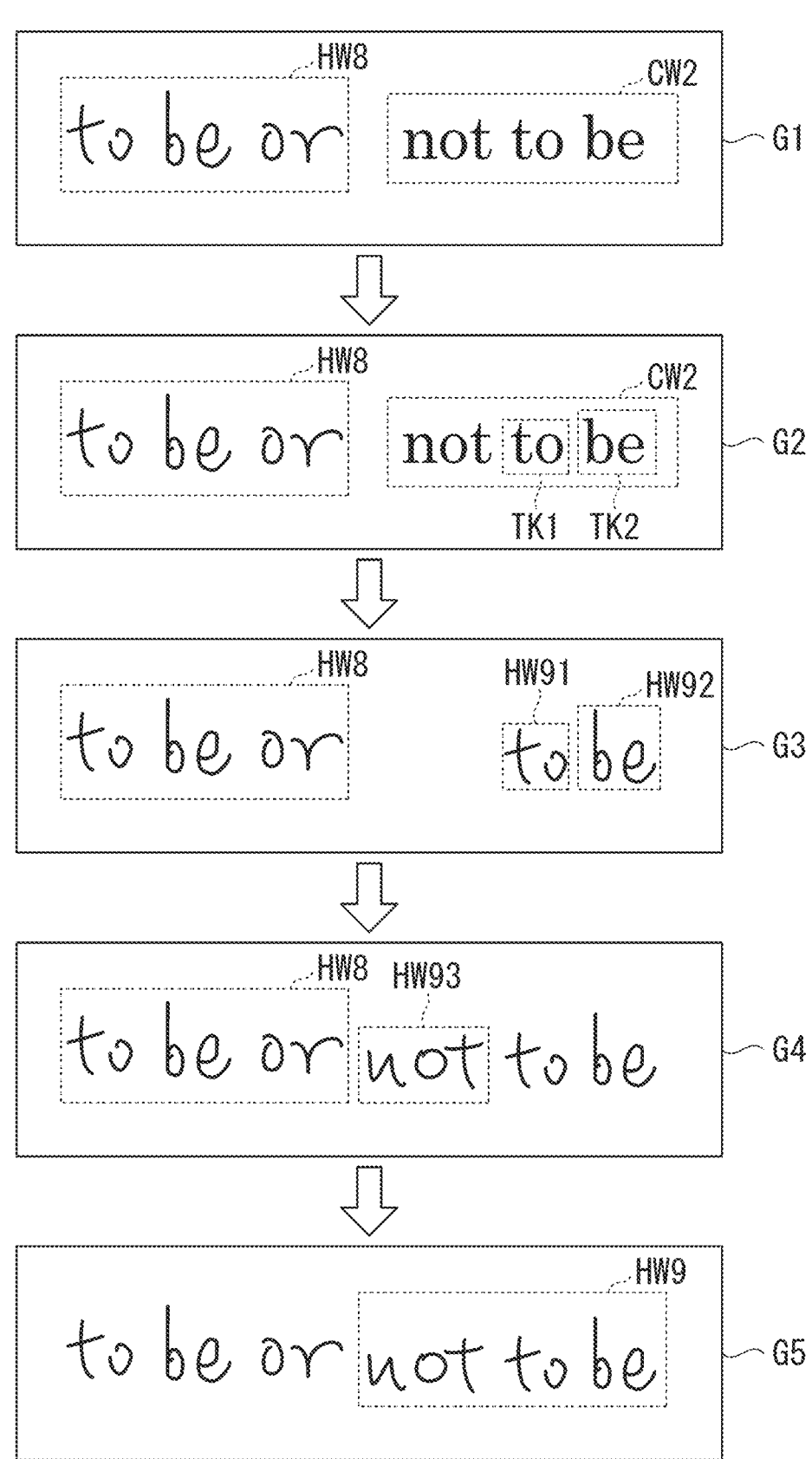
FIG. 13 is a diagram illustrating a display example of handwriting synthesis processing of the tablet terminal according to one or more embodiments.
Figure 14:
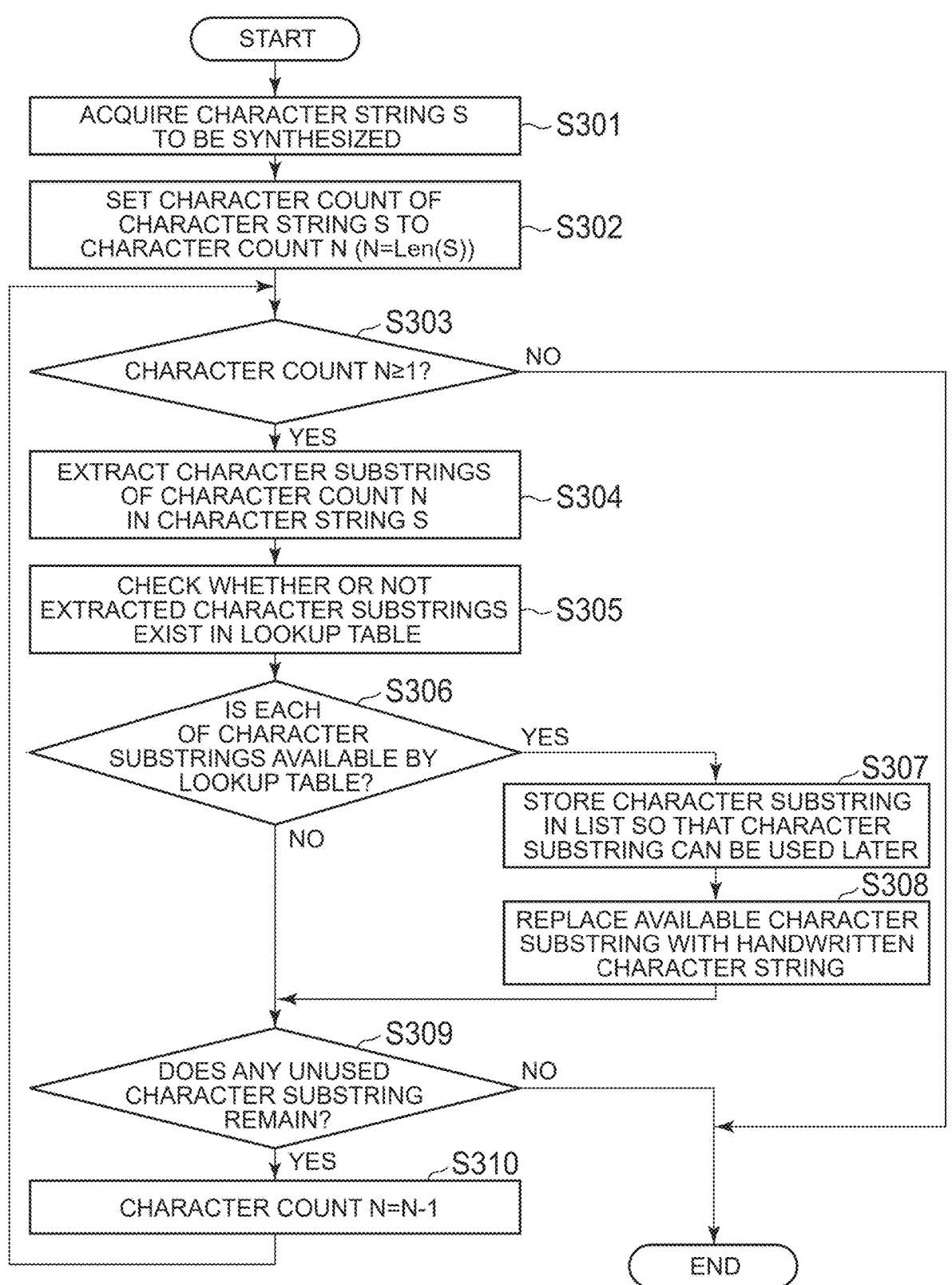
FIG. 14 is a flowchart illustrating an example of hand-writing conversion processing using tokens of the tablet terminal according to one or more embodiments.

Referring next to FIG. 12 to FIG. 14, detailed operation of handwriting synthesis processing in one or more embodiments will be described.

FIG. 12 is a flowchart illustrating an example of handwriting synthesis processing of the tablet terminal 1 according to one or more embodiments.

As illustrated in FIG. 12, the handwriting synthesis unit 104 of the tablet terminal 1 first refers to the lookup table to extract matched tokens from target text (for example, text candidates) (step S201). The handwriting synthesis unit 104 extracts tokens contained in the target text from the lookup table stored in the lookup table storage unit 45.

Next, the handwriting synthesis unit 104 generates handwritten characters corresponding to the matched tokens based on the lookup table (step S202). The handwriting synthesis unit 104 performs the token-based processing to make a conversion to the handwritten characters token by token. The handwriting synthesis unit 104 performs decode processing on corresponding token information to generate the handwritten characters.

Next, the handwriting synthesis unit 104 converts remaining characters to handwritten characters using the conversion model (step S203). The handwriting synthesis unit 104 converts, by the model-based processing, the remaining characters that do not match the tokens into handwritten characters character by character.

Next, the handwriting synthesis unit 104 generates handwritten characters finally synthesized and corresponding to the target text. The handwriting synthesis unit 104 synthesizes the handwritten characters generated in the processing (token-based processing) of step S202, and the handwritten characters generated in the processing (model-based processing) of step S203, and outputs the final handwritten characters (the handwritten characters corresponding to the target text).

Further, FIG. 13 is a diagram illustrating an example of handwriting synthesis processing of the tablet terminal 1 according to one or more embodiments. The example in FIG. 13 illustrates an example of converting a text candidate CW2 ("not to be") to a handwritten character string HW9 to follow a handwritten character string HW8 ("to be or") as user's handwritten input.

In FIG. 13, the display processing unit 105 first displays, on the display unit 21, the handwritten character string HW8 ("to be or") as illustrated in an image G1, and displays a text string of the text candidate CW2 ("not to be").

Next, for example, as illustrated in an image G2 of FIG. 13, the handwriting synthesis unit 104 extracts a token TK1 ("to") and a token TK2 ("be").

Next, the handwriting synthesis unit 104 converts, by the token-based processing, the token TK1 ("to") and the token TK2 ("be") to a handwritten character string HW91 and a handwritten character string HW92, respectively. Then, as illustrated in an image G3 of FIG. 13, the display processing unit 105 displays the handwritten character string HW91 and the handwritten character string HW92 on the display unit 21.

Next, the handwriting synthesis unit 104 generates a handwritten character string HW93 for the remaining token ("not") by the model-based processing. Then, as illustrated in an image G4 of FIG. 13, the display processing unit 105 displays the handwritten character string HW93 on the display unit 21.

Finally, as illustrated in an image G5 of FIG. 13, the display processing unit 105 displays, on the display unit 21, the handwritten character string HW9 corresponding to the text candidate CW2 ("not to be").

The example in which the display processing unit 105 displays the text candidate CW2 on the display unit 21 in the image G1 of FIG. 13 is described, but the text candidate CW2 may not be displayed. Further, the display processing unit 105 may display, on the display unit 21, the handwritten character string HW9 all at once after generating the handwritten character string HW9.

Referring next to FIG. 14, the details of handwriting conversion processing by the token-based processing will be described.

FIG. 14 is a flowchart illustrating handwriting conversion processing using tokens of the tablet terminal 1 according to one or more embodiments. Note that processing illustrated in FIG. 14 corresponds to the processes from step S201 to step S203 illustrated in FIG. 12 described above.

As illustrated in FIG. 14, the handwriting synthesis unit 104 of the tablet terminal 1 acquires a character string S to be synthesized (step S301). Here, the character string S is a text string such as a text candidate.

Next, the handwriting synthesis unit 104 sets a character count of the character string S to a character count N (N=Len(S)) (step S302). Note that an integer equal to or more than 1 can be set (assigned) to the character count N.

Next, the handwriting synthesis unit 104 determines whether or not the character count N is equal to or more than "1" (N≥1) (step S303). When the character count N is equal to or more than "1" (N≥1) (step S303: YES), the handwriting synthesis unit 104 advances the processing to step S304. When the character count N is not equal to or more than "1" (N=0) (step S303: NO), the handwriting synthesis unit 104 ends the processing.

In step S304, the handwriting synthesis unit 104 extracts character substrings of the character count N in the character string S. For example, the handwriting synthesis unit 104 extracts the character substrings like the string of five characters CG1 to the strings of two characters CG4 illustrated in FIG. 7.

Next, the handwriting synthesis unit 104 checks whether or not the extracted character substrings exist in the lookup table (step S305). The handwriting synthesis unit 104 refers to the lookup table stored in the lookup table storage unit 45 to check whether or not there is a text string that matches any of the extracted substrings of characters.

Next, the handwriting synthesis unit 104 determines whether or not each of the character substrings is available by the lookup table (step S306). In other words, the handwriting synthesis unit 104 determines whether or not each of the character substrings is registered as a token in the lookup table. When each of the character substrings is available by the lookup table (step S306: YES), the handwriting synthesis unit 104 advances the processing to step S307. When each of the character substrings is not available by the lookup table (when the character substring is not registered as a token in the lookup table) (step S306: NO), the handwriting synthesis unit 104 advances the processing to step S309.

In step S307, the handwriting synthesis unit 104 stores the character substring in a list so that the character substring can be used later. For example, the handwriting synthesis unit 104 stores the list of each of the character substrings in the storage unit 40.

Next, the handwriting synthesis unit 104 replaces the available character substring with a handwritten character string (step S308). The handwriting synthesis unit 104 acquires token information corresponding to the character substring using the lookup table, and performs decode processing on the token information to generate the handwritten character string corresponding to the character substring (token). After the process in step S308, the handwriting synthesis unit 104 advances the processing to step S309.

In step S309, the handwriting synthesis unit 104 determines whether or not any unused character substring remains. When any unused character substring remains (step S309: YES), the handwriting synthesis unit 104 advances the processing to step S310. When any unused character substring does not remain (step S309: NO), the handwriting synthesis unit 104 ends the processing.

In step S310, the handwriting synthesis unit 104 subtracts "1" from the character count N (N=N−1). After the process in step S310, the handwriting synthesis unit 104 returns the processing to step S303, and repeats the processes from step S303 to step S310 until the character count N becomes "0."

Note that the character substring whose character count N is "1" corresponds to one text character, and the handwriting synthesis unit 104 converts, by the model-based processing, the remaining one text character, to which the token-based processing cannot be applied, into a handwritten character.

Figure 15:
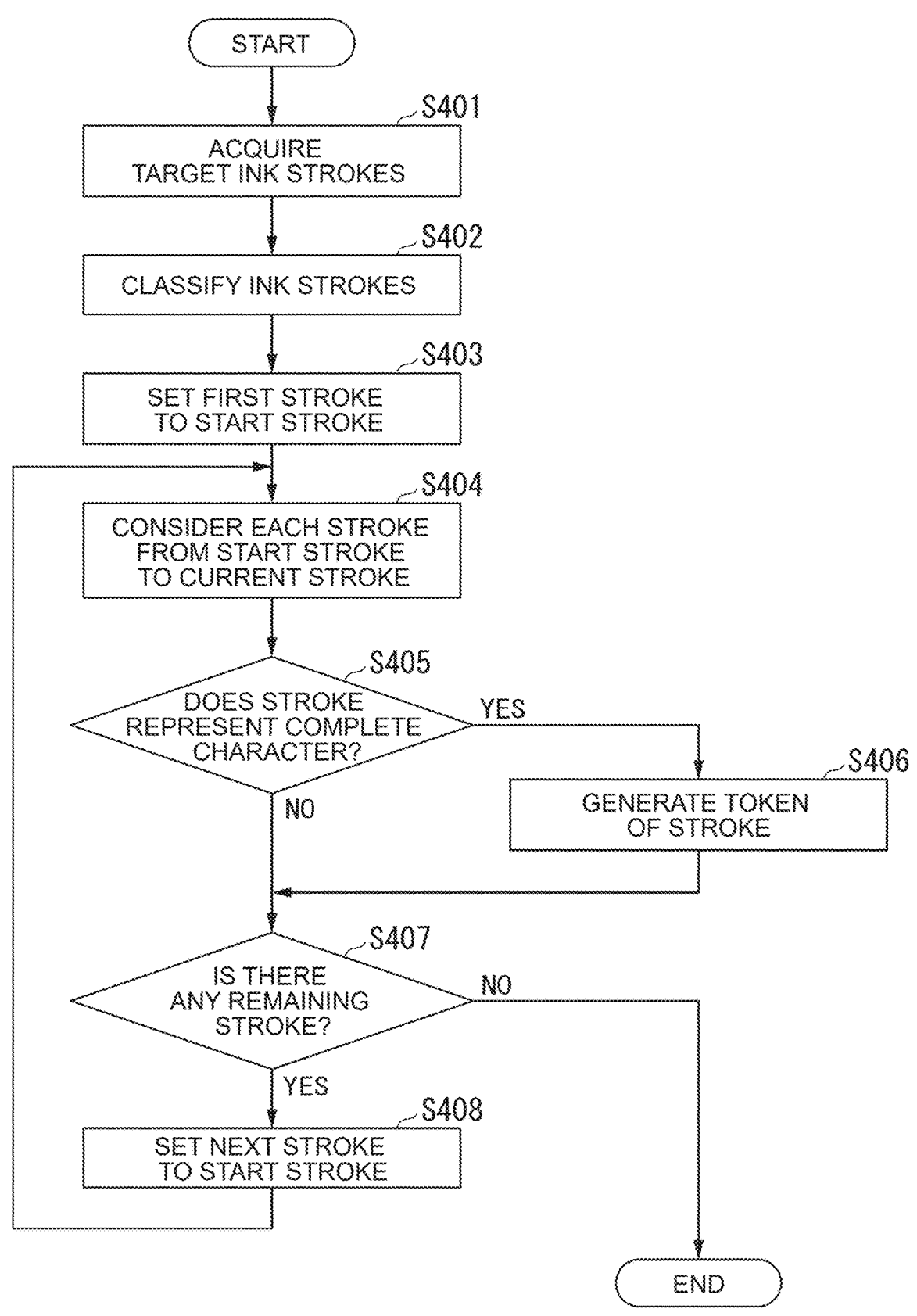
FIG. 15 is a flowchart illustrating an example of token generation processing of the tablet terminal according to one or more embodiments.

Referring next to FIG. 15, the details of token generation processing of the tablet terminal 1 according to one or more embodiments will be described.

FIG. 15 is a flowchart illustrating an example of token generation processing of the tablet terminal 1 according to one or more embodiments.

As illustrated in FIG. 15, the token generation unit 107 of the tablet terminal 1 acquires target ink strokes (handwriting of the pen 30) (step S401). The target ink strokes (handwriting of the pen 30) here are ink strokes (handwriting of the pen 30) as handwritten input by the user.

Next, the token generation unit 107 classifies the ink strokes (step S402). The token generation unit 107 classifies whether or not the ink strokes correspond to characters (or a character string), and extracts ink strokes corresponding to the characters (or the character string).

Next, the token generation unit 107 sets the first stroke (handwriting) to a start stroke (a stroke of the start of a token) (step S403).

Next, the token generation unit 107 considers each stroke from the start stroke to the current stroke (step S404). The token generation unit 107 analyzes each stroke to consider whether or not each stroke represents a complete character.

Next, the token generation unit 107 determines whether or not the stroke represents the complete character (step S405). When the stroke represents the complete character (step S405: YES), the token generation unit 107 advances the processing to step S406. When the stroke does not represent the complete character (step S405: NO), the token generation unit 107 advances the processing to step S407.

In step S406, the token generation unit 107 generates a token of the stroke. The token generation unit 107 adds, to the lookup table of the lookup table storage unit 45, the text string corresponding to the stroke, and token information (encoded data) obtained by performing the encode processing on the stroke in association with each other. In other words, the token generation unit 107 makes a history of the text string corresponding to the stroke and the token information in association with each other in the lookup table storage unit 45. After the process in step S406, the token generation unit 107 advances the processing to step S407.

In step S407, the token generation unit 107 determines whether or not there is any remaining stroke. When there is any remaining stroke (step S407: YES), the token generation unit 107 advances the processing to step S408. When there is no remaining stroke (step S407: NO), the token generation unit 107 end the processing.

In step S408, the token generation unit 107 sets the next stroke to a start stroke (a stroke of the start of a token). After the process in step S408, the token generation unit 107 returns the processing to step S404, and repeats the processes from step S404 to step S408 until there are no more remaining strokes.

As described above, the tablet terminal 1 (information processing apparatus) according to one or more embodiments includes the touch sensor unit 22 (input unit), the display unit 21, the text recognition unit 102, the prediction processing unit 103, the handwriting synthesis unit 104, and the display processing unit 105. The touch sensor unit 22 (input unit) can detect handwritten input. The display unit 21 can display a trajectory (ink strokes) of the handwritten input. The text recognition unit 102 recognizes text based on the handwritten input detected by the touch sensor unit 22. The prediction processing unit 103 predicts text candidates following the text based on the text recognized by the text recognition unit 102. The handwriting synthesis unit 104 combines first generation processing (for example, the token-based processing) and second generation processing (for example, the model-based processing) to synthesize the text candidates predicted by the prediction processing unit 103 into handwritten characters. In the first generation processing, the handwriting synthesis unit 104 generates handwritten characters based on tokens, each of which is a set of one or more handwriting strokes, collected from the handwritten input by a user. In the second generation processing, the handwriting synthesis unit 104 generates handwritten characters based on a conversion model prepared in advance for converting text to handwritten characters. The display processing unit 105 displays, on the display unit 21, the handwritten characters corresponding to the text candidates and synthesized by the handwriting synthesis unit 104.

Thus, since the tablet terminal 1 (information processing apparatus) according to one or more embodiments combines the first generation processing using tokens (for example, token-based processing) and the second generation processing using a conventional conversion model (for example, model-based processing) to synthesize the text candidates into the handwritten characters, a delay in displaying the handwritten characters can be reduced.

For example, in the example of converting the text string "juice" to handwritten characters and displaying the converted handwritten characters as illustrated in FIG. 7, when only a conventional method (second generation processing using a conversion model (for example, the model-based processing) is used, the display delay time is 0.56 s (seconds) to 0.59 s (seconds). In contrast to this, when the method of the hybrid processing (the method of combining the first generation processing using tokens (for example, the token-based processing) and the second generation processing using the conversion model (for example, the model-based processing)) according to one or more embodiments described above is used, since the display delay time is 0.17 s to 0.25 s, which becomes about ½, the delay in displaying the handwritten characters is improved significantly. Thus, the tablet terminal 1 can significantly reduce the delay in displaying the handwritten characters. Therefore, the tablet terminal 1 can improve the productivity of handwritten input.

Further, since tokens are collected form handwritten input by the user, the tablet terminal 1 according to one or more embodiments can faithfully reproduce the handwritten characters by the user by using the tokens.

Further, the tablet terminal 1 according to one or more embodiments includes the lookup table storage unit 45 which stores a lookup table in which token information indicative of each of the tokens is associated with each text string. The handwriting synthesis unit 104 generates, by the first generation processing (for example, the token-based processing), handwritten characters of a character string that matches the text string stored in the lookup table storage unit 45 among the text candidates. Further, the handwriting synthesis unit 104 generates, by the second generation processing (for example, the model-based processing), characters that do not match the text string stored in the lookup table storage unit 45 among the text candidates.

Thus, the tablet terminal 1 according to one or more embodiments can generate handwritten characters in the first generation processing (for example, the token-based processing) rapidly by a simple method using the lookup table. Therefore, the tablet terminal 1 can further reduce the delay in displaying the handwritten characters, and can further improve the productivity of handwritten input.

Further, in one or more embodiments, the handwriting synthesis unit 104 synthesizes the text candidates into handwritten characters by executing first processing, second processing, and third processing. In the first generation processing (for example, the token-based processing) as the first processing, the handwriting synthesis unit 104 extracts a character string of an N character count from the text candidates, and when the extracted character string matches the text string stored in the lookup table storage unit 45, the handwriting synthesis unit 104 converts the text string to the handwritten characters based on the token information corresponding to the matched text string (note that N is an integer equal to or more than 1). As the second processing, the handwriting synthesis unit 104 subtracts 1 from N after the first processing to repeat the first processing until the N character count becomes one character count. As the third processing, the handwriting synthesis unit 104 generates, by the second generation processing, a handwritten character for a character that does not match after the second processing.

Thus, the tablet terminal 1 according to one or more embodiments can extract tokens efficiently from the text candidates by executing the first processing to the third processing described above. Therefore, the tablet terminal 1 can further reduce the delay in displaying the handwritten characters, and can further improve the productivity of the handwritten input.

Further, the tablet terminal 1 according to one or more embodiments includes the token generation unit 107 which collects the tokens based on the trajectory of the handwritten input, and stores, in the lookup table storage unit 45, the collected tokens in association of each piece of the token information with each of the text strings for each of the tokens.

Thus, the tablet terminal 1 according to one or more embodiments includes the token generation unit 107 so that a token(s) can be extracted from user's handwritten input and can update the lookup table properly. Therefore, the tablet terminal 1 can generate handwritten characters suitable for the user.

Further, in one or more embodiments, the display processing unit 105 displays, on the display unit 21, display information indicative of the text candidates predicted by the prediction processing unit 103, and when the touch sensor unit 22 accepts a consent operation to consent to a text candidate (for example, an operation to select one candidate from the plural text candidates), the display processing unit 105 displays, on the display unit 21, the handwritten character(s) corresponding to the text candidate and synthesized by the handwriting synthesis unit 104.

Thus, since the tablet terminal 1 according to one or more embodiments can display the text candidate, and accepts the consent operation to confirm the text candidate, the input efficiency of handwritten input can be improved and the productivity of the handwritten input can be improved.

Further, in one or more embodiments, the display processing unit 105 may display, on the display unit 21, the text candidate in a specific font as display information indicative of the text candidate, and when the touch sensor unit 22 accepts the consent operation, the display processing unit 105 may change the text candidate being displayed in the specific font to the handwritten characters synthesized by the handwriting synthesis unit 104.

Thus, since the tablet terminal 1 according to one or more embodiments displays, on the display unit 21, the text candidate in the specific font, the handwritten characters can be generated behind the screen on which the text candidate is being displayed. As a result, the tablet terminal 1 can reduce the delay in displaying the handwritten characters.

Further, a control method according to one or more embodiments is a control method for the tablet terminal 1 including the touch sensor unit 22 capable of detecting handwritten input, and the display unit 21 capable of displaying a trajectory of the handwritten input. The control method includes a text recognition step, a prediction processing step, a handwriting synthesis step, and a display processing step. In the text recognition step, the text recognition unit 102 recognizes text based on handwritten input detected by the touch sensor unit 22. In the prediction processing step, the prediction processing unit 103 predicts text candidates following the text based on the text recognized by the text recognition unit 102. In the handwriting synthesis step, the handwriting synthesis unit 104 synthesizes the text candidates predicted by the prediction processing unit 103 into handwritten characters by combining first generation processing (for example, the token-based processing) to generate handwritten characters based on tokens, each of which is a set of one or more handwriting strokes, collected from the handwritten input by a user, and second generation processing (for example, the model-based processing) to generate handwritten characters based on a conversion model prepared in advance for converting text characters to handwritten characters. In the display processing step, the display processing unit 105 displays, on the display unit 21, the handwritten characters corresponding to the text candidate and synthesized by the handwriting synthesis unit 104.

Thus, the control method according to one or more embodiments has the same effect as the tablet terminal 1 described above, which can significantly reduce a delay in displaying handwritten characters and hence can improve the productivity of handwritten input.

Note that the tablet terminal 1 (information processing apparatus) according to one or more embodiments described above may also be in a form below. The tablet terminal 1 (information processing apparatus) includes: the touch sensor unit 22 capable of detecting handwritten input; the display unit 21 capable of displaying a trajectory of the handwritten input; the main memory 12 (a memory) which temporarily stores a program; and the processor 11 which executes the program stored in the main memory 12. The processor 11 executes the program stored in the main memory 12 to execute text recognition processing, prediction processing, handwriting synthesis processing, and display processing. As the text recognition processing, the processor 11 recognizes text based on handwritten input detected by the touch sensor unit 22. As the prediction processing, the processor 11 predicts text candidates following the text based on the text recognized by the text recognition processing. As the handwriting synthesis processing, the processor 11 synthesizes the text candidates predicted in the prediction processing into handwritten characters by combining first generation processing (for example, the token-based processing) to generate handwritten characters based on tokens, each of which is a set of one or more handwriting strokes, collected from the handwritten input by a user, and second generation processing (for example, the model-based processing) to generate handwritten characters based on a conversion model prepared in advance for converting text characters to handwritten characters. As the display processing, the processor 11 causes the display processing unit 105 to display, on the display unit 21, the handwritten characters corresponding to the text candidates and synthesized in the handwriting synthesis processing.

Thus, the tablet terminal 1 according to one or more embodiments can significantly reduce a delay in displaying handwritten characters, and hence can improve the productivity of handwritten input.

Note that the present invention is not limited to any particular embodiment and the form mentioned above, and changes are possible without departing from the scope of the present invention.

For example, the example in which the information processing apparatus is the tablet terminal 1 is described in one or more embodiments and the form mentioned above, but the present invention is not limited to this example. For example, the information processing apparatus may be a smartphone or a laptop personal computer having a tablet mode.

Further, in one or more of the aforementioned embodiments, the example in which the OS is Android (registered trademark) is described, but the present invention is not limited to this example, and the OS may also be any other OS such as Windows (registered trademark) or iOS (registered trademark).

Further, in one or more of the aforementioned embodiments, the example in which the operating medium is the pen 30 is described, but the present invention is not limited to this example, and the operating medium may also be any other operating medium such as a user's finger.

Further, in one or more of the aforementioned embodiments, the example in which the tablet terminal 1 includes the predictive learning unit 106 and the token generation unit 107 is described, but the present invention is not limited to this example, and the tablet terminal 1 may also be configured to include either one of the predictive learning unit 106 and the token generation unit 107, or configured not to include both.

Further, in one or more of the aforementioned embodiments, the example in which the prediction processing unit 103 predicts the text candidates using the predictive learning result (next-text predictive model) is described, but the present invention is not limited to this example, and any other method may also be used such as a method of storing past inputs to predict inputs similar to the past inputs as text candidates.

Note that the tablet terminal 1 described above has a computer system therein. Then, a program for implementing the function of each component included in the tablet terminal 1 described above may be recorded on a computer-readable recording medium so that the program recorded on this recording medium is read into the computer system and executed to perform processing in each component included in the tablet terminal 1 described above. Here, the fact that "the program recorded on the recording medium is read into the computer system and executed" includes installing the program on the computer system. It is assumed that the "computer system" here includes the OS and hardware such as peripheral devices and the like.

Further, the "computer system" may also include two or more computers connected through networks including the Internet, WAN, LAN, and a communication line such as a dedicated line. Further, the "computer-readable recording medium" means a portable medium such as a flexible disk, a magneto-optical disk, a flash ROM, or a CD-ROM, or a storage device such as a hard disk built in the computer system. Thus, the recording medium with the program stored thereon may be a non-transitory recording medium such as the CD-ROM.

Further, a recording medium internally or externally provided to be accessible from a delivery server for delivering the program is included as the recording medium. Note that the program may be split into plural pieces, downloaded at different timings, respectively, and then united in each component included in the tablet terminal 1, or delivery servers for delivering respective split pieces of the program may be different from one another. Further, it is assumed that the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called a differential file (differential program) capable of implementing the above-described functions in combination with a program(s) already recorded in the computer system.

Further, some or all of the functions described above may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Description of Symbols

1 tablet terminal
10 main control unit
11 processor
12 main memory
13 flash memory
20 touch screen
21 display unit
22 touch sensor unit
23 peripheral device
24 audio system
25 microphone
26 speaker
27 baseband chip
28 wireless unit
30 pen
40 storage unit
41 handwritten input storage unit
42 predictive learning result storage unit
43 synthesis information storage unit
44 text history storage unit
45 lookup table storage unit
101 handwritten input processing unit
102 text recognition unit
103 prediction processing unit
104 handwriting synthesis unit
105 display processing unit
106 predictive learning unit
107 token generation unit

What is claimed is:

1. An information processing apparatus comprising:
a touch sensor capable of detecting handwritten input;

a display capable of displaying a trajectory of the handwritten input; and
a processor configured to:
recognize text based on the handwritten input detected by the touch sensor;
predict text candidates following the text based on the recognized text;
synthesize the text candidates into handwritten characters by combining first generation processing to generate handwritten characters based on tokens, each of which is a set of one or more handwriting strokes, collected from the handwritten input by a user, and second generation processing to generate handwritten characters based on a conversion model prepared in advance for converting text characters to handwritten characters; and
a display, on the display, the handwritten characters corresponding to the text candidates,
wherein the information processing apparatus further comprises a memory that stores a lookup table in which token information indicative of each of the tokens is associated with each text string, and
wherein the processor is further configured to:
the processor generates, by the first generation processing, handwritten characters corresponding to a character string that matches the text string stored in the memory among the text candidates, and
the processor generates, by the second generation processing, handwritten characters corresponding to characters that do not match the text string stored in the memory among the text candidates.

2. The information processing apparatus according to claim 1, wherein the processor synthesizes the text candidates into handwritten characters by executing
first processing to extract a character string of an N character count from the text candidates in the first generation processing, and when the extracted character string matches the text string stored in the memory, the generator converts the text string to the handwritten characters based on the token information corresponding to the matched text string (note that N is an integer equal to or more than 1),
second processing to subtract 1 from N after the first processing so as to repeat the first processing until the N character count becomes one character count, and
third processing to generate, by the second generation processing, a handwritten character for a character that does not match after the second processing.

3. The information processing apparatus according to claim 1, wherein the processor collects the tokens based on the trajectory of the handwritten input, and stores, in the memory, the collected tokens in association between each piece of the token information and each of the text strings for each of the tokens.

4. The information processing apparatus according to claim 1, wherein
the processor displays, on the display, display information indicative of the text candidates predicted by the processor, and when the touch sensor accepts a consent operation to consent to the text candidates, the processor displays, on the display, the handwritten characters corresponding to the text candidates and synthesized by the processor.

5. The information processing apparatus according to claim 4, wherein the processor displays, on the display, the text candidates in a specific font as display information indicative of the text candidates, and when the touch sensor accepts the consent operation, the processor changes the text candidates being displayed in the specific font to the handwritten characters synthesized by the processor.

6. A control method for an information processing apparatus including touch sensor capable of detecting handwritten input and a display capable of displaying a trajectory of the handwritten input, the control method comprising:

recognizing, by a processor of the information processing apparatus, text based on the handwritten input detected by the touch sensor;

predicting, by the processor, text candidates following the text based on the recognized;

synthesizing, by the processor, the text candidates into handwritten characters by combining first generation processing to generate handwritten characters based on tokens, each of which is a set of one or more handwriting strokes, collected from the handwritten input by a user, and second generation processing to generate handwritten characters based on a conversion model prepared in advance for converting text characters to handwritten characters, wherein a memory of the information processing apparatus stores a lookup table in which token information indicative of each of the tokens is associated with each text string; and displaying, by the processor on the display, the handwritten characters corresponding to the text candidates, wherein the first generation processing generates handwritten characters corresponding to a character string that matches the text string stored in the memory among the text candidates, and wherein the second generation processing generates handwritten characters corresponding to characters that do not match the text string stored in the memory among the text candidates.

* * * * *